(12) United States Patent
Urabe

(10) Patent No.: US 10,872,557 B2
(45) Date of Patent: Dec. 22, 2020

(54) DISPLAY CONTROL APPARATUS AND DISPLAY CONTROL METHOD

(71) Applicant: CANON KABUSHIKI KAISHA, Tokyo (JP)

(72) Inventor: Hirofumi Urabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/358,998

(22) Filed: Mar. 20, 2019

(65) Prior Publication Data
US 2019/0295454 A1  Sep. 26, 2019

(30) Foreign Application Priority Data

Mar. 22, 2018  (JP) .................. 2018-054294

(51) Int. Cl.
*G09G 3/22* (2006.01)
*G09G 3/34* (2006.01)
*G06F 9/30* (2018.01)

(52) U.S. Cl.
CPC ............. *G09G 3/22* (2013.01); *G06F 9/3004* (2013.01); *G09G 3/3406* (2013.01); *G09G 2320/0646* (2013.01); *G09G 2320/0666* (2013.01); *G09G 2330/021* (2013.01)

(58) Field of Classification Search
CPC ...... G09G 3/22; G09G 3/3406; G09G 3/3611; G09G 3/3208; G09G 2320/0646; G09G 2320/0666; G09G 2330/031; G09G 2360/16; G06F 9/3004
See application file for complete search history.

(56) References Cited

U.S. PATENT DOCUMENTS

| 2006/0250385 | A1* | 11/2006 | Plut ........................ G09G 5/00 345/211 |
| 2007/0200803 | A1* | 8/2007 | Kimura ................ G09G 3/2014 345/76 |
| 2013/0050295 | A1* | 2/2013 | Tada .................... G09G 3/3233 345/690 |

(Continued)

FOREIGN PATENT DOCUMENTS

| JP | 2007-298778 A | 11/2007 |
| JP | 2010-016757 A | 1/2010 |
| JP | 2010-244013 A | 10/2010 |

*Primary Examiner* — Ryan A Lubit
(74) *Attorney, Agent, or Firm* — Cowan, Liebowitz & Latman, P.C.

(57) ABSTRACT

A display control apparatus includes: an obtaining unit that obtains average luminance information representing a maximum period average luminance value which is a maximum value of average luminance in target image data for each frame in a first period; and a setting unit that sets one of a first control mode for displaying an image based on the target image data with carrying out power limiting processing for reducing display luminance of each frame so that power consumption by a display unit is equal to or less than a predetermined power threshold value and a second control mode for displaying the image without carrying out the power limiting processing, wherein the setting unit sets the second control mode in a case where the maximum period average luminance value is higher than a first threshold value on the basis of the average luminance information.

20 Claims, 10 Drawing Sheets

| CASE | MAXIMUM FRAME LUMINANCE VALUE | AVERAGE FRAME LUMINANCE VALUE | DISPLAY LUMINANCE VALUE CORRESPONDING TO MAXIMUM LUMINANCE VALUE | DISPLAY LUMINANCE VALUE CORRESPONDING TO AVERAGE LUMINANCE VALUE | |
|------|-------------------------------|--------------------------------|------------------------------------------------------------------|------------------------------------------------------------------|---|
| A | 1000cd/m² | 400cd/m² | 1000cd/m² | 400cd/m² | |
| B | 1000cd/m² | 700cd/m² | 714cd/m² | 500cd/m² | ← POWER LIMITING PROCESSING |
| C | 2000cd/m² | 800cd/m² | 1000cd/m² | 400cd/m² | ← GRADATION COMPRESSION /POWER LIMITING PROCESSING |
| D | 500cd/m² | 100cd/m² | 500cd/m² | 100cd/m² | |

(56) References Cited

U.S. PATENT DOCUMENTS

| | | | |
|---|---|---|---|
| 2014/0354698 A1* | 12/2014 | Lee | G09G 3/3233 |
| | | | 345/690 |
| 2015/0009249 A1* | 1/2015 | Kudo | G09G 3/36 |
| | | | 345/691 |
| 2018/0308434 A1* | 10/2018 | Nakanishi | G09G 3/36 |
| 2019/0051253 A1* | 2/2019 | Shin | G09G 3/3233 |

* cited by examiner

FIG. 2

| CONTROL MODE | UPPER LIMIT DISPLAY LUMINANCE | UPPER LIMIT AVERAGE DISPLAY LUMINANCE | AVERAGE LUMINANCE THRESHOLD IN POWER LIMITING PROCESSING | BLACK DISPLAY LUMINANCE |
|---|---|---|---|---|
| LOADING CONTROL | 1000cd/m$^2$ | 500cd/m$^2$ | 500cd/m$^2$ | 0.005cd/m$^2$ |
| NON-LOADING CONTROL | 600cd/m$^2$ | 600cd/m$^2$ | — | 0.005cd/m$^2$ |

FIG. 6

| CONTROL MODE | UPPER LIMIT DISPLAY LUMINANCE | UPPER LIMIT AVERAGE DISPLAY LUMINANCE | AVERAGE LUMINANCE THRESHOLD IN POWER LIMITING PROCESSING | BLACK DISPLAY LUMINANCE |
|---|---|---|---|---|
| LOADING CONTROL | 1200cd/m$^2$ | 500cd/m$^2$ | 500cd/m$^2$ | 0.005cd/m$^2$ |
| FIRST NON-LOADING CONTROL | 1000cd/m$^2$ | 1000cd/m$^2$ | — | 0.010cd/m$^2$ |
| SECOND NON-LOADING CONTROL | 600cd/m$^2$ | 600cd/m$^2$ | — | 0.005cd/m$^2$ |

FIG. 10

| CASE | MAXIMUM FRAME LUMINANCE VALUE | AVERAGE FRAME LUMINANCE VALUE | DISPLAY LUMINANCE VALUE CORRESPONDING TO MAXIMUM LUMINANCE VALUE | DISPLAY LUMINANCE VALUE CORRESPONDING TO AVERAGE LUMINANCE VALUE | |
|---|---|---|---|---|---|
| A | 1000cd/m$^2$ | 400cd/m$^2$ | 1000cd/m$^2$ | 400cd/m$^2$ | |
| B | 1000cd/m$^2$ | 700cd/m$^2$ | 714cd/m$^2$ | 500cd/m$^2$ | ← POWER LIMITING PROCESSING |
| C | 2000cd/m$^2$ | 800cd/m$^2$ | 1000cd/m$^2$ | 400cd/m$^2$ | ← GRADATION COMPRESSION /POWER LIMITING PROCESSING |
| D | 500cd/m$^2$ | 100cd/m$^2$ | 500cd/m$^2$ | 100cd/m$^2$ | |

DISPLAY CONTROL APPARATUS AND DISPLAY CONTROL METHOD

BACKGROUND OF THE INVENTION

Field of the Invention

The present invention relates to a display control apparatus and a display control method.

Description of the Related Art

Various standards including PQ (Perceptual Quantizer) and HLG (Hybrid Log-Gamma) have been proposed as standards for image data having a wide dynamic range (wide luminance range). According to PQ, an absolute luminance value of 10000 $cd/m^2$ is specified as an upper limit luminance value, while according to HLG, an upper limit luminance value of 1000 $cd/m^2$ is specified as a relative luminance value. The wide dynamic range is called "HDR (High Dynamic Range)," and image data having a wide dynamic range is called "HDR image data."

An image-sensing apparatus such as a digital camera and a display apparatus such as a liquid crystal display apparatus and an organic EL (Electro-Luminescence) display apparatus have come to provide higher performance. For example, displayed images have improved contrasts and dynamic ranges. Conventional techniques related to contrast and dynamic range improvement about displayed images are disclosed for example in Japanese Patent Application Publication No. 2010-244013. In the disclosure of Japanese Patent Application Publication No. 2010-244013, the backlight unit of a liquid crystal display apparatus has a plurality of light sources, and the emission luminance of each of the light sources is individually controlled. The emission luminance of a light source corresponding to a dark section of an image is controlled to have a lower emission luminance value than the emission luminance value of a light source corresponding to a bright section of the image, so that the contrast and dynamic range of the displayed image may be improved.

The upper limit display luminance value by a display apparatus has increased. However, the increase in the display luminance gives rise to increase in the power consumption by the display apparatus. There is a conventional technique known as power limiting processing for reducing the display luminance value of each frame to be not more than a threshold value. In the power limiting processing, the display luminance value is reduced for example when the average luminance value of frames is higher than the threshold value.

SUMMARY OF THE INVENTION

However, in the power-liming processing, as the average frame luminance fluctuates, the display luminance also fluctuates. More specifically, the same gradation value among frames may be represented by different display luminance values among the frames. The fluctuations in the display luminance are not preferable for example when a video content such as a movie is produced.

The present invention provides a technique for suitably suppressing the increase in the power consumption and the fluctuations in the display luminance.

The present invention in its first aspect provides a display control apparatus comprising at least one processor that operates as:

an obtaining unit configured to obtain average luminance information representing a maximum period average luminance value which is a maximum value of average luminance in target image data for each frame in a first period including a plurality of frames; and a setting unit configured to set one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein the setting unit sets the second control mode in a case where the maximum period average luminance value is higher than a first threshold value on the basis of the average luminance information.

The present invention in its second aspect provides a display control apparatus comprising at least one processor that operates as:

an obtaining unit configured to obtain average luminance information representing a maximum period average luminance value which is a maximum value of average luminance in target image data in each frame in a first period including a plurality of frames and first maximum luminance information representing first maximum period luminance which is maximum luminance in target image data in the first period; and a setting unit configured to set one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein the setting unit sets the first control mode in a case where the first maximum period luminance is equal to or less than predetermined upper limit display luminance and the maximum period average luminance value is equal to or less than first upper limit average display luminance.

The present invention in its third aspect provides a display control method comprising:

an obtaining step of obtaining average luminance information representing a maximum period average luminance value which is a maximum value of average luminance in target image data for each frame in a first period including a plurality of frames; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the second control mode is set in a case where the maximum period average luminance value is higher than a first threshold value on the basis of the average luminance information.

The present invention in its fourth aspect provides a display control method comprising:

an obtaining step of obtaining average luminance information representing a maximum period average luminance value which is a maximum value of average luminance in target image data in each frame in a first period including a plurality of frames and first maximum luminance information representing first maximum period luminance which is maximum luminance in target image data in the first period; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the first control mode is set in a case where the first maximum period luminance is equal to or less than predetermined upper limit display luminance and the maximum period average luminance value is equal to or less than first upper limit average display luminance.

The present invention in its fifth aspect provides a non-transitory computer readable medium that stores a program, wherein the program causes a computer to execute:

an obtaining step of obtaining average luminance information representing a maximum period average luminance value which is a maximum value of average luminance in target image data for each frame in a first period including a plurality of frames; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the second control mode is set in a case where the maximum period average luminance value is higher than a first threshold value on the basis of the average luminance information.

The present invention in its first aspect provides a non-transitory computer readable medium that stores a program, wherein the program causes a computer to execute:

an obtaining step of obtaining average luminance information representing a maximum period average luminance value which is a maximum value of average luminance in target image data in each frame in a first period including a plurality of frames and first maximum luminance information representing first maximum period luminance which is maximum luminance in target image data in the first period; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the first control mode is set in a case where the first maximum period luminance is equal to or less than predetermined upper limit display luminance and the maximum period average luminance value is equal to or less than first upper limit average display luminance.

According to the present invention, the increase in the power consumption and the fluctuations in the display luminance can be suppressed suitably.

Further features of the present invention will become apparent from the following description of exemplary embodiments with reference to the attached drawings.

BRIEF DESCRIPTION OF THE DRAWINGS

FIG. 2 is a table for illustrating exemplary control modes according to the first embodiment;

FIG. 6 is a table for illustrating an exemplary control mode according to a second embodiment of the present invention;

FIG. 10 is a table illustrating examples of frame maximum luminance, average frame luminance, and frame display luminance.

DESCRIPTION OF THE EMBODIMENTS

Examples of Problems to be Solved by Invention

There is a conventional technique known as power limiting processing for reducing increase in power consumption by a display apparatus which displays an image at a display screen thereof by reducing the display luminance (luminance (brightness) at the display screen) of each frame to be equal to or lower than a predetermined threshold value. In the power limiting processing, the display luminance is reduced when the average frame luminance is higher than the threshold value. In the power limiting processing carried out by a liquid crystal display apparatus, for example, the emission luminance of the backlight unit is reduced in order to reduce the display luminance. In the power limiting processing carried out by a self-emitting apparatus such as an organic EL apparatus, the driving current value/driving voltage value of the organic EL apparatus is reduced in order to reduce the display luminance. However, in the power limiting processing, the display luminance fluctuates as the average frame luminance fluctuates.

Figure 9:
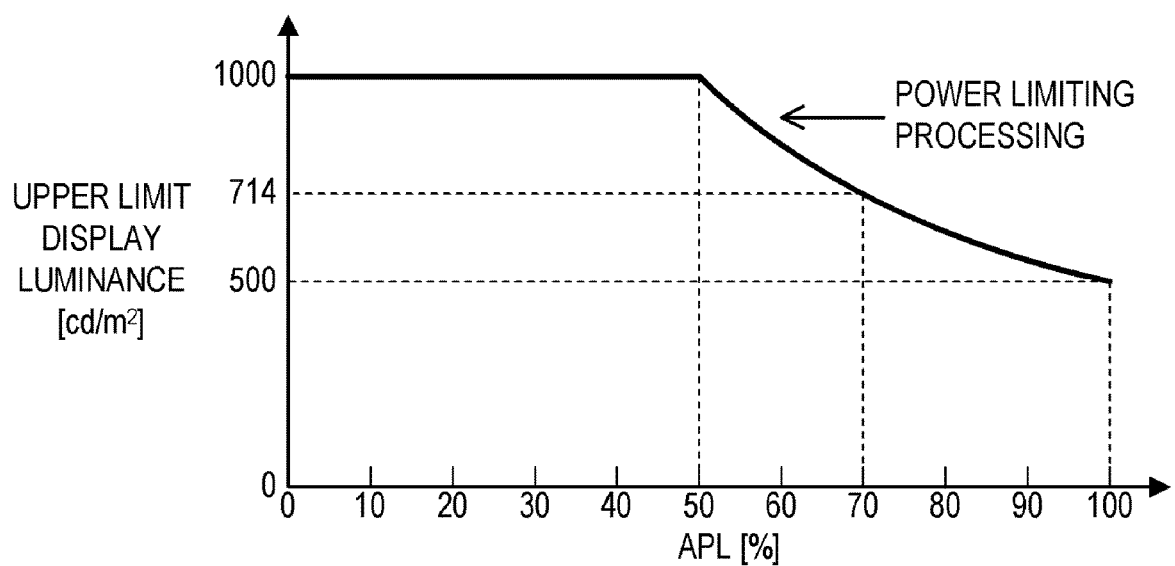
FIG. 9 is a graph representing an exemplary corresponding relation between APL and an upper limit display luminance value.

FIG. 9 is an exemplary corresponding relation between the APL (Average Pixel Level) of a frame (image) and the upper limit display luminance of a display apparatus. APL represents the average gradation value for an image (frame). The upper limit display luminance value is for example a white display luminance value. In the example shown in FIG. 9, when the APL value is 50% or less, display with an upper limit display luminance value of 1000 cd/m² is carried out, and as the APL value increases from 50% to 100%, the upper limit display luminance value is reduced from 1000 cd/m² to 500 cd/m². When for example 40% of the area of an image is in white and 60% of the area is in black, the APL value is 40% and the white part is displayed with 1000 cd/m². Meanwhile, when the entire image is in white, the APL value is 100%, and the white part is displayed with 500 cd/m². In the example in FIG. 9, in response to the increase in APL from 50% to 100%, the upper limit display luminance value is reduced from 1000 cd/m² to 500 cd/m², so that the average display luminance value is 500 cd/m². It is only necessary that the final average display luminance value is not more than 500 cd/m², and the average display luminance value may fluctuate in response to the increase in APL from 50% to 100%.

The fluctuations in the display luminance are not preferable when a video content such as a movie is produced. Therefore, according to the present invention, increase in the power consumption and fluctuations in the display luminance are suitably suppressed.

As a standard for image data with a wide dynamic range (wide luminance range), various standards including PQ (Perceptual Quantizer) and HLG (Hybrid Log-Gamma) have been proposed. According to PQ, an absolute luminance of 10000 cd/m² is specified as an upper limit luminance value, while according to HLG, an upper limit luminance value of 1000 cd/m² is specified as a relative luminance value. The wide dynamic range is called "HDR (High Dynamic Range)," and image data having a wide dynamic range is called "HDR image data."

As a standard for HDR image data, standards such as HDR10 and HDR10+(Plus) have been proposed. HDR10 specifies metadata such as a maximum luminance value in the entire period of a video content, an average luminance value in the entire period of the video content (HDR Static Metadata Extensions CEA-861.3). HDR10+ specifies maximum luminance data in each scene of a video content as metadata (Dynamic Metadata by SMPTE ST.2094).

A maximum luminance value in a video content (such as a maximum luminance value in the entire period and a maximum luminance value in a scene) may be higher than the upper limit display luminance value by the display apparatus in some cases. When a maximum luminance value in a video content is not more than the upper limit display luminance value by the display apparatus, display luminance faithful to the video content may be provided by using the HDR10 or HDR10+ metadata. However, when the maximum luminance value in a video content is higher than the upper limit display luminance value by the display apparatus, a display luminance value lower than the maximum luminance value is obtained as a display luminance value corresponding to the maximum luminance value in the video content. For example, the display luminance value corresponding to the maximum luminance value in the video content is restricted to the upper limit display luminance value. As a result, according to HDR10, a dark frame may be displayed with a very low display luminance value (very low visibility). According to HDR10+, the display luminance value may vary even more among scenes.

FIG. 10 gives a maximum frame luminance value in a video content, the average frame luminance value, and examples of display luminance values therefor. FIG. 10 gives an example in which the display apparatus can be set to an upper limit display luminance value up to 1000 cd/m² and power limiting processing corresponding to the corresponding relation in FIG. 9 is carried out.

In case A, the maximum luminance value is 1000 cd/m², while the average luminance value is 400 cd/m². The average luminance value of 400 cd/m² corresponds to 40% in APL. In this case, the maximum frame (image) luminance value is not more than 1000 cd/m² which is the upper limit display luminance value by the display apparatus, gradation compression processing (gradation conversion processing carried out to compress the dynamic range) corresponding to the maximum frame (image) luminance value is not carried out. Since the APL of the frame (image) is not more than 50%, power limiting is not applied. According to the corresponding relation given in FIG. 9, when APL is 40%, the upper limit display luminance value is set to 1000 cd/m². Note that 1000 cd/m² as the maximum luminance value is equal to 1000 cd/m² as the upper limit display luminance value. Therefore, 1000 cd/m² is obtained as a display luminance value corresponding to 1000 cd/m² as the maximum luminance value, so that an average display luminance value of 400 cd/m² is obtained corresponding to 400 cd/m² as the average luminance value (display with faithful display luminance).

In case B, the maximum luminance value is 1000 cd/m², and the average luminance value is 700 cd/m². The average luminance value of 700 cd/m² corresponds to 70% in APL. In this case, the maximum frame (image) luminance value is not more than 1000 cd/m² which is the upper limit display luminance value by the display apparatus, and therefore the gradation compression processing corresponding to the maximum frame (image) luminance value is not carried out, but power limiting is applied since the APL of the frame (image) is greater than 50%. According to the corresponding relation in FIG. 9, the upper limit display luminance value is set to 714 cd/m² when APL is 70%. The maximum luminance value of 1000 cd/m² is higher than 714 cd/m² which is the upper limit display luminance value. Therefore, 714 cd/m² is obtained as a display luminance value corresponding to the maximum luminance value of 1000 cd/m², and the resulting average display luminance value corresponding to 700 cd/m² as the average luminance value is 500 cd/m² (display with display luminance lower than faithful display luminance).

In case C, the maximum luminance value is 2000 cd/m², and the average luminance value is 800 cd/m². As described above, the upper limit display luminance value cannot be set to a value equal to or higher than 1000 cd/m². Therefore, the gradation compression processing for compressing the entire gradation of the image is carried out so that the maximum frame (image) luminance value is reduced from 2000 cd/m² to 1000 cd/m² which is the upper limit display luminance value by the display apparatus (compression of the dynamic range). As a result, the average luminance value is reduced from 800 cd/m² to 400 cd/m². Display with the same display luminance as in case A is carried out. Therefore, the resulting display luminance value corresponding to the maximum luminance value of 2000 cd/m² is 1000 cd/m², and the resulting average display luminance value corresponding to the average luminance value of 800 cd/m² is 400 cd/m² (display with display luminance lower than faithful display luminance). In this way, the gradation compression processing corresponding to the maximum frame (image) luminance value is carried out, so that the average luminance value is reduced to 500 cd/m² or less and power limiting is carried out. Note that gradation conversion processing (clipping processing) for clipping the luminance value (luminance value of the image) exceeding 1000 cd/m² as the upper limit display luminance value to 1000 cd/m² may be carried out. In this case, the APL of the frame (image) is sometimes greater than 50%, so that power limiting may be applied.

In case D, the maximum luminance value is 500 cd/m$^2$, and the average luminance value is 100 cd/m$^2$. The average luminance value of 100 cd/m$^2$ corresponds to 10% in APL. In this case, the maximum frame (image) luminance value is not more than 1000 cd/m$^2$ which is the upper limit display luminance value by the display apparatus, the gradation compression processing corresponding to the maximum frame (image) luminance value is not carried out, and power limiting is not applied since the APL of the video content is not more than 50%. According to the corresponding relation in FIG. 9, the upper limit display luminance value is set to 1000 cd/m$^2$ when APL is 10%. The maximum luminance value of 500 cd/m$^2$ is lower than the upper limit display luminance value of 1000 cd/m$^2$. Therefore, the resulting display luminance value corresponding to the maximum luminance value of 500 cd/m$^2$ is 500 cd/m$^2$, and the resulting display luminance value corresponding to the average luminance value of 100 cd/m$^2$ is 100 cd/m$^2$ (display with faithful display luminance).

A control method called "local dimming control" is known as a method for displaying an image for example by a liquid crystal display apparatus having a plurality of light sources. For example, in the local dimming control, the emission luminance values of the light sources of the backlight are individually controlled. The emission luminance value of a light source corresponding to the dark section of an image is controlled at an emission luminance value lower than the emission luminance value of a light source corresponding to the bright section of the image, so that the contrast and dynamic range of the display image (image displayed on the display screen) may be improved.

In the local dimming control, when the emission light luminance of the light source corresponding to the dark section is constant, the contrast and dynamic range of the display image can be improved as the emission luminance of the light source corresponding to the bright section increases. However, light emitted from a light source diffuses, and when the emission luminance of the light source corresponding to the bright section is high, image quality degradation (halo) is caused, which causes the surrounding part of the bright section to be faintly lightened. In the local dimming control, as the upper limit emission luminance is higher, halo is more likely to be caused. Halo can be reduced by lowering the upper limit emission luminance. This however lowers the display luminance or reduces the effects of contrast and dynamic range improvements.

As in the foregoing, there are various display methods, each of which has its advantage and disadvantage. A suitable display method depends on a video content and a scene. Therefore, according to the present invention, an image is displayed by a suitable display method.

First Embodiment

Now, a first embodiment of the present invention will be described. A display control apparatus according to the embodiment controls display at a display unit (display apparatus). A display apparatus including a display control apparatus according to the embodiment will be described by way of illustration. The display control apparatus may be a discrete apparatus from the display apparatus.

The display apparatus may be a transmission-type display apparatus or a self-emitting type display apparatus. The transmission-type display apparatus includes a light-emitting unit and a transmission-type display panel which transmits light emitted from the light-emitting unit on the basis of image data to display an image. For example, the transmission-type display apparatus is a liquid crystal display apparatus having a backlight unit and a liquid crystal panel. The transmission-type display panel may be an MEMS (Micro Electro Mechanical System) shutter type display panel. The self-emitting type display apparatus has a self-emitting type display panel such as an organic EL (Electro-Luminescence) panel and a plasma panel. The display apparatus may be a projector which projects an image on a display screen discrete from the display apparatus.

The light-emitting unit of the transmission-type display apparatus may have a plurality of light source units corresponding to a plurality of areas at the display screen. The light source units each have at least one light source (light-emitting element). The light source may be an LED (light-emitting diode), an organic EL (Electro-Luminescence) element, a laser light source, a cold cathode-ray tube, or a plasma element. In this case, local dimming control for controlling the light emission luminance of each of the light source units individually may be executed. The multiple areas each form a part of the area of the display screen (partial areas). The number, shape, position, size, etc. of the partial areas are not particularly limited. For example, the plurality of partial areas may be or may not be a plurality of divisional areas which together constitute the display screen. Some partial areas may be apart from the other areas, or at least some of the partial areas may overlap at least some of the other partial areas.

Figure 1:
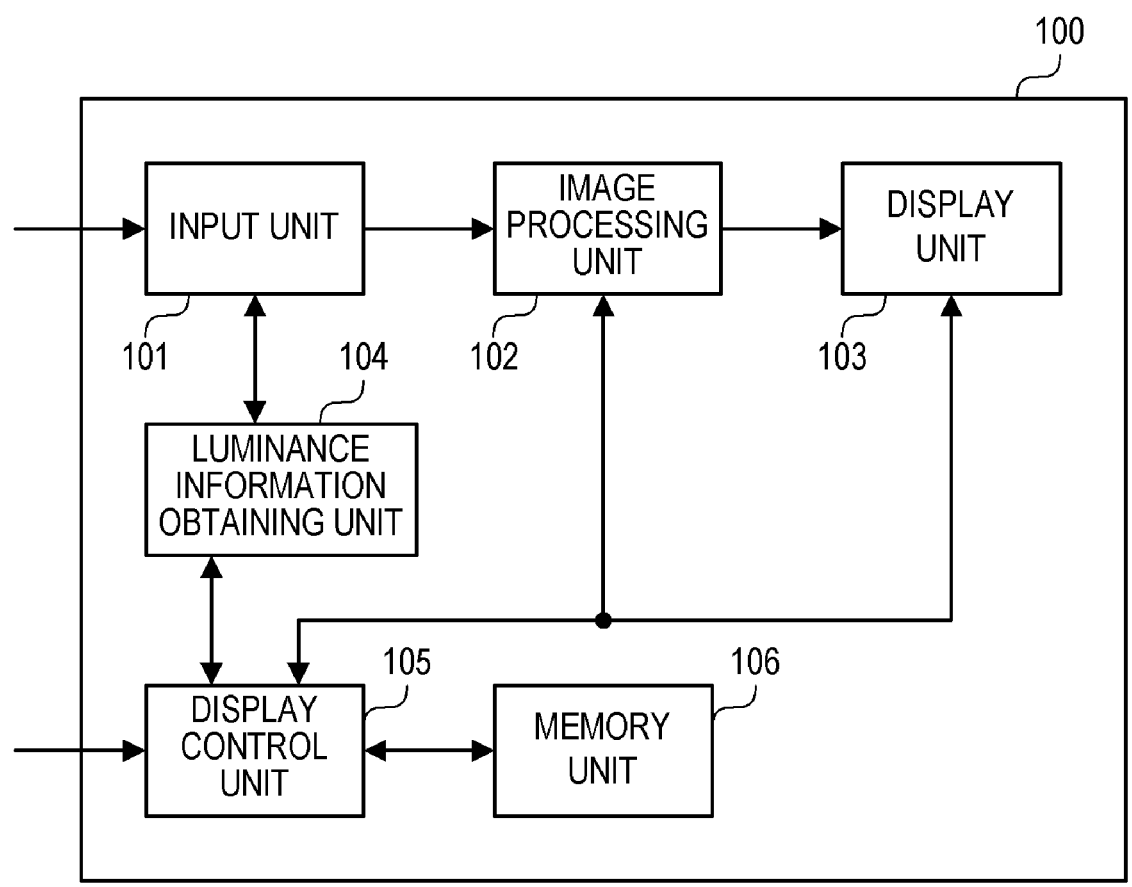
FIG. 1 is a block diagram illustrating an exemplary configuration of a display apparatus according to a first embodiment of the present invention.

FIG. 1 is a block diagram illustrating an exemplary configuration of the display apparatus 100 according to the embodiment. The display apparatus 100 includes an input unit 101, an image processing unit 102, a display unit 103, a luminance information obtaining unit 104, a display control unit 105, and a memory unit 106.

The input unit 101 obtains target image data and outputs the target image data to the image processing unit 102. For example, the target image data is HDR image data in conformity with HDR10, HDR10+, PQ, HLG, etc. and image data on a video content. The target image data includes a plurality of frames, and for example image data is obtained on a frame basis. According to the embodiment, the input unit 101 obtains the target image data (input image data) from an external apparatus from the display apparatus 100. For example, the input unit 101 is an input terminal in conformity with a standard such as SDI (Serial Digital Interface) and HDMI (High-Definition Multimedia Interface). The external apparatus may be an image-sensing apparatus, a reproducing apparatus, etc. Note that the display apparatus 100 may have a storage unit for storing image data, and the input unit 101 may obtain, as the target image data, image data stored in the storage unit from the storage unit.

The input unit 101 obtains the metadata of the target image data from the target image data and outputs the obtained metadata to the luminance information obtaining unit 104. The metadata is InfoFrame specified by HDMI, ANC (Ancillary) data in a blanking region specified by SDI, etc.

The image processing unit 102 subjects the target image data output from the input unit 101 to image processing to produce processed image data. The image processing unit 102 outputs the processed image data to the display unit 103. For example, the image processing unit 102 carries out gradation compression processing (mapping) for compressing the dynamic range of the target image data. More specifically, in the gradation compression processing, a dynamic range of 10000 cd/m² or less is compressed to a dynamic range of 1000 cd/m² or less or to a dynamic range of 2000 cd/m² or less.

The display unit 103 displays an image on the basis of the target image data at the display screen. More specifically, the display unit 103 displays an image on the display screen on the basis of the processed image data output from the image processing unit 102. The display unit 103 can carry out the power limiting processing.

The luminance information obtaining unit 104 obtains the metadata output from the input unit 101 and obtains luminance information related to the luminance of the target image data from the metadata. The luminance information obtaining unit 104 outputs the luminance information to the display control unit 105. According to the embodiment, the metadata includes a maximum period average luminance value as a maximum value for the average luminance of the target image data on each of the frames in the period including the plurality of frames. Also according to the embodiment, the metadata includes maximum luminance information representing the maximum period luminance as the maximum luminance of the target image data in the period including the plurality of frames. The luminance information obtaining unit 104 obtains average luminance information, maximum luminance information, etc.

For example, the maximum period average luminance value includes a maximum value for the average luminance of target image data in each of frames in the period of one scene in a video content (a maximum scene average luminance value), and the maximum scene average luminance value is prepared for each of the scenes. The maximum period average luminance value may include a maximum value for the average luminance of target image data in each of frames in the entire period of a video content (a maximum entire content average luminance value). The maximum period average luminance value may include both or one of the maximum scene average luminance value for each scene and the entire content average maximum value. Note that the maximum period average luminance value may include a maximum value for the average luminance of target image data for each frame in the period including a plurality of scenes in a video content.

The maximum period luminance includes maximum luminance for target image data in the period of one scene in a video content (maximum scene luminance), and the maximum scene luminance is prepared for each scene. The maximum period luminance may include the maximum luminance of target image data in the entire period of a video content (maximum entire content luminance value). The maximum period luminance value may include one or both of the maximum scene luminance value for each scene and the maximum entire content luminance value. Note that the maximum period luminance value may include the maximum luminance value of target image data in a period including a plurality of scenes in a video content.

The display control unit 105 controls the processing by the functional units of the display apparatus 100. The memory unit 106 stores programs, parameters, etc. For example, the display control unit 105 is an arithmetic processing circuit which carries out a program stored in the memory unit 106 to control processing by the functional units of the display apparatus 100. The display control unit 105 may obtain operation setting information corresponding to user operation carried out by a user (user operation) for example to a button which is not shown. The display control unit 105 may switch the control and set details about the control according to the operation setting information.

According to the embodiment, the display control unit 105 controls processing by the image processing unit 102 or the display unit 103 on the basis of luminance information output from the luminance information obtaining unit 104. For example, the display control unit 105 determines a dynamic range on the basis of the luminance information. The display control unit 105 informs the image processing unit 102 of the determined dynamic range so that the dynamic range of the target image data is converted to the determined dynamic range. The display control unit 105 may instruct the image processing unit 102 to execute dynamic range conversion (gradation conversion). The display control unit 105 determines a control mode (display mode: a method for displaying an image) on the basis of the luminance information and instructs the display unit 103, so that the determined control mode is applied. For example, the display control unit 105 determines an upper limit display luminance value by the display unit 103 or determines an upper limit emission luminance by the light-emitting unit of the display unit 103 and determines whether to carry out power limiting processing. Then, the display control unit 105 informs the display unit 103 of these kinds of determined information.

FIG. 2 illustrates an exemplary control mode according to the embodiment. As in FIG. 2, the display apparatus 100 has a control mode for control to carry out the power limiting processing and the display an image at the display unit 103 and a control mode for control to display an image at the display unit 103 without carrying out the power limiting processing. As described above, in the power limiting processing, when the average frame luminance as the average luminance of the frames is higher than a threshold value, the display luminance is reduced.

In control including the power limiting processing in general, when the average frame luminance value is not more than a threshold value, a high upper limit display luminance value is set so that display with higher display luminance is enabled. Meanwhile, in control without the power limiting processing, a lower upper limit display luminance value than the high upper limit display luminance value in the control including the power limiting processing is set in order to suppress heat generation by the display unit 103, increase in power consumption by the display unit 103, etc. More specifically, in the control including the power limiting processing, the upper limit load for the display unit 103 is greater than the upper limit load in the control without the power limiting processing. Therefore, the control including the power limiting processing may be called "loading control," while the control without the power limiting processing may be called "non-loading control." The upper limit display luminance value in the control without the power limiting processing is higher than the threshold value in the power limiting processing.

In FIG. 2, the threshold value in the power limiting processing is 500 cd/m². In the loading control, the upper limit display luminance value is set to 1000 cd/m² when the average frame luminance value is not more than 500 cd/m². Note that the user may manually set the upper limit display luminance value to 1000 cd/m² or less. In the non-loading control, the upper limit display luminance value is set to 600 cd/m². Either in the loading control or the non-loading control, the black display luminance value is 0.005 cd/m². In the loading control mode for the loading control, the maximum value for the displayable average frame luminance (the upper limit average display luminance value) is 500 cd/m². In the non-loading control mode for the non-loading control, the maximum value for the displayable average frame luminance (the upper limit average display luminance value) is 600 cd/m$^2$.

Figure 3:
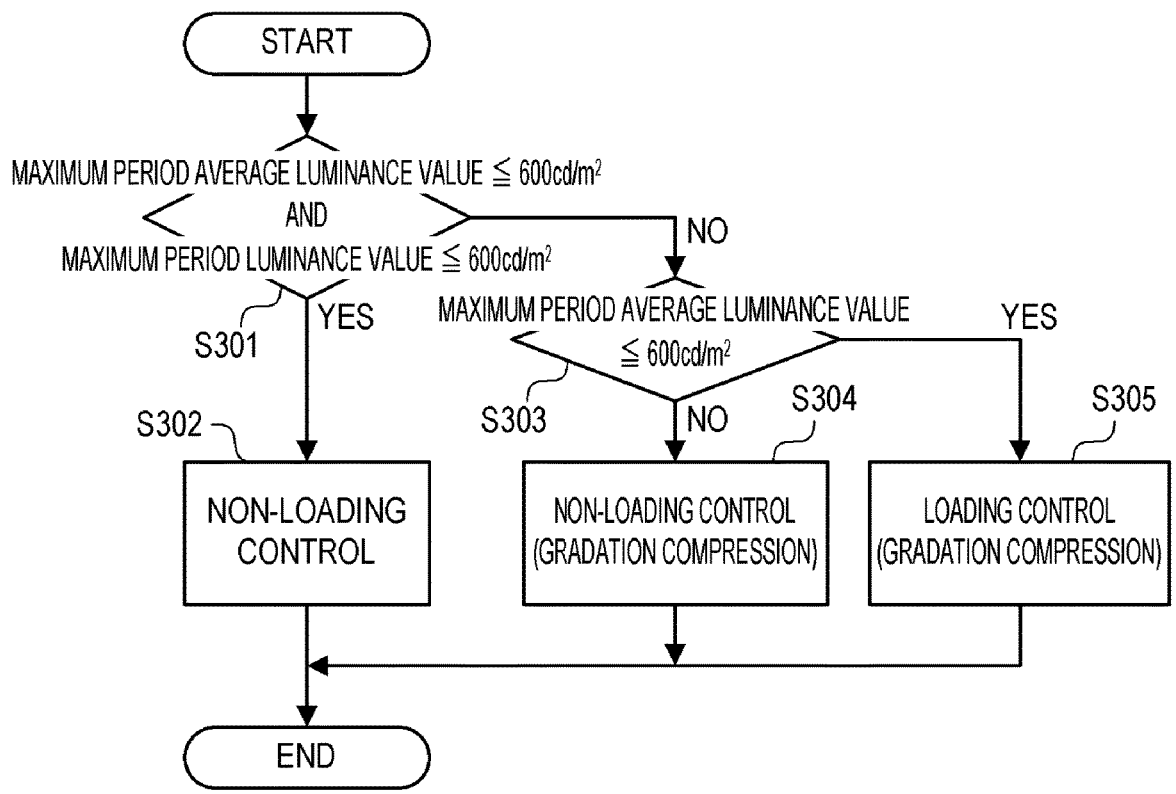
FIG. 3 is a flowchart for illustrating an exemplary processing flow according to the first embodiment.

FIG. 3 is a flowchart for illustrating an exemplary processing flow by the display apparatus 100. The processing flow in FIG. 3 starts in response to obtaining of target image data, a change in luminance information (at least one of the average luminance information and the maximum luminance information), etc. Here, it is assumed that the display apparatus 100 has the control mode in FIG. 2.

In step S301, the display control unit 105 determines whether the maximum period average luminance value and the maximum period luminance value of a video content are both not more than 600 cd/m$^2$ which is the upper limit display luminance value in the non-loading control. When the maximum period average luminance value and the maximum period luminance are both not more than 600 cd/m$^2$, the processing proceeds from step S301 to step S302. When at least one of the maximum period average luminance value and the maximum period luminance value is higher than 600 cd/m$^2$, the processing proceeds from step S301 to step S303.

When the maximum period average luminance value and the maximum period luminance are both not more than 600 cd/m$^2$, the non-loading control is carried out, so that display luminance faithful to target image data may be provided without reducing the display luminance of each of the frames (images) of a video content. Therefore, in step S302, the display control unit 105 sets the control mode for the non-loading control (without carrying out the power limiting processing). Note that in the liquid crystal apparatus, when the "local dimming control" is carried out, halo is more likely to be generated, as the upper limit emission luminance of a light source is higher as described above. More specifically, in the loading mode in which the upper limit display luminance value is 1000 cd/m$^2$, halo is more likely to be generated than in the non-loading control mode in which the upper limit display luminance value is 600 cd/m$^2$. Therefore, the non-loading control is carried out in step S302, so that halo may be reduced. However, if the effect of halo may be disregarded, the loading control may be carried out in step S303. Since halo is not easily generated in a self-emitting type display apparatus such as an organic EL display apparatus, the loading control mode may be carried out in step S303.

In step S303, the display control unit 105 determines whether the maximum period average luminance value is not more than 600 cd/m$^2$ which is the upper limit average display luminance value in the non-loading control. If the maximum period average luminance value is not more than 600 cd/m$^2$ and the maximum period luminance maximum value is higher than 600 cd/m$^2$, the processing proceeds from step S303 to step S305. If the maximum period average luminance value is higher than 600 cd/m$^2$, the processing proceeds from step S303 to step S304.

If the maximum period average luminance value is higher than 600 cd/m$^2$, it may be considered that a majority of the frames has a value higher than 500 cd/m$^2$ which is the threshold value in power limiting processing. Fluctuations in the display luminance value are more likely to be generated between the frames having a large drop in display luminance caused by the power limiting processing and a value higher than 500 cd/m$^2$ which is the threshold value in the power limiting processing and the rest of the frames. Therefore, in step S304, the display control unit 105 sets the control mode for the non-loading control (without carrying out the power limiting processing). Note that in step S304, since the maximum period average luminance value is higher than 600 cd/m$^2$, the maximum period luminance value is naturally higher than 600 cd/m$^2$. In the control mode for the non-loading control, the upper limit display luminance value is 600 cd/m$^2$, and therefore the gradation compression processing is carried out so that for example the maximum luminance value in target image data in the entire period of a video content (the maximum entire content luminance value) is reduced to 600 cd/m$^2$. In this way, in the entire period of the video content, the degree of how much the display luminance value is reduced is fixed, and therefore fluctuations in the display luminance value can be suppressed.

When the maximum period average luminance value is not more than 600 cd/m$^2$ and the maximum period luminance value is higher than 600 cd/m$^2$, it is considered that only a small number of frames have an average frame luminance value higher than the threshold value of 500 cd/m$^2$ in the power limiting processing. It is also considered that a reduction in the display luminance value caused by the power limiting processing is small, and therefore a disadvantage associated the loading control is small. In the non-loading control, a display luminance value higher than 600 cd/m$^2$ cannot be provided. When the maximum period luminance value is higher than 600 cd/m$^2$, display luminance faithful to the target image data cannot be achieved by the non-loading control. Meanwhile, in the loading control, a display luminance value higher than 600 cd/m$^2$ may be provided in some cases. When the maximum period luminance value is higher than 600 cd/m$^2$, a display luminance value faithful to the target image data may be provided (for example when there is a localized small area with high luminance in the target image data). Therefore, in step S305, the display control unit 105 sets the control mode for the loading control (carrying out the power limiting processing).

In step S305, the display control unit 105 controls the processing by the image processing unit 102 so that the gradation compression processing for compressing the dynamic range of the target image data to a predetermined dynamic range is carried out. As described above, in the loading control, the upper limit display luminance value is set to a value not more than 1000 cd/m$^2$. Therefore, according to the embodiment, the gradation compression processing is carried out to compress the dynamic range of the target image data to a dynamic range not more than 1000 cd/m$^2$. The gradation compression processing may include partial gradation compression processing for compressing a part of the dynamic range of the target image data, entire gradation compression processing for compressing the entire dynamic range of the target image data.

Note that according to the embodiment, the local dimming control is carried out in all of steps S302, S304, and S305 though this is not intended to limit the invention. For example, the local dimming control may be carried out in steps S302 and S305 and not in step S304. The local dimming control need not be carried out in any of steps S302, S304, and S305.

It is determined in steps S301 and S303 whether the maximum period average luminance value of the video content is not more than 600 cd/m$^2$ which is the upper limit display luminance value in the non-loading control, while it may be determined whether the maximum value is not more than 500 cd/m$^2$ which is the upper limit average display luminance value. Stated differently, it is determined in this case whether the maximum period average luminance value in the video content is not more than 500 cd/m$^2$ which is the average luminance threshold value in the power limiting processing in the loading control.

As described above, according to the embodiment, control (control mode) in the period corresponding to the maximum period average luminance value and the maximum period luminance value is determined on the basis of the maximum period average luminance value and the maximum period luminance value in a video content. In this way, each frame of target image data may be displayed with suitable display luminance. Increase in the power consumption and fluctuations in the display luminance can be suppressed in a suitable manner.

Modification of First Embodiment

Figure 4:
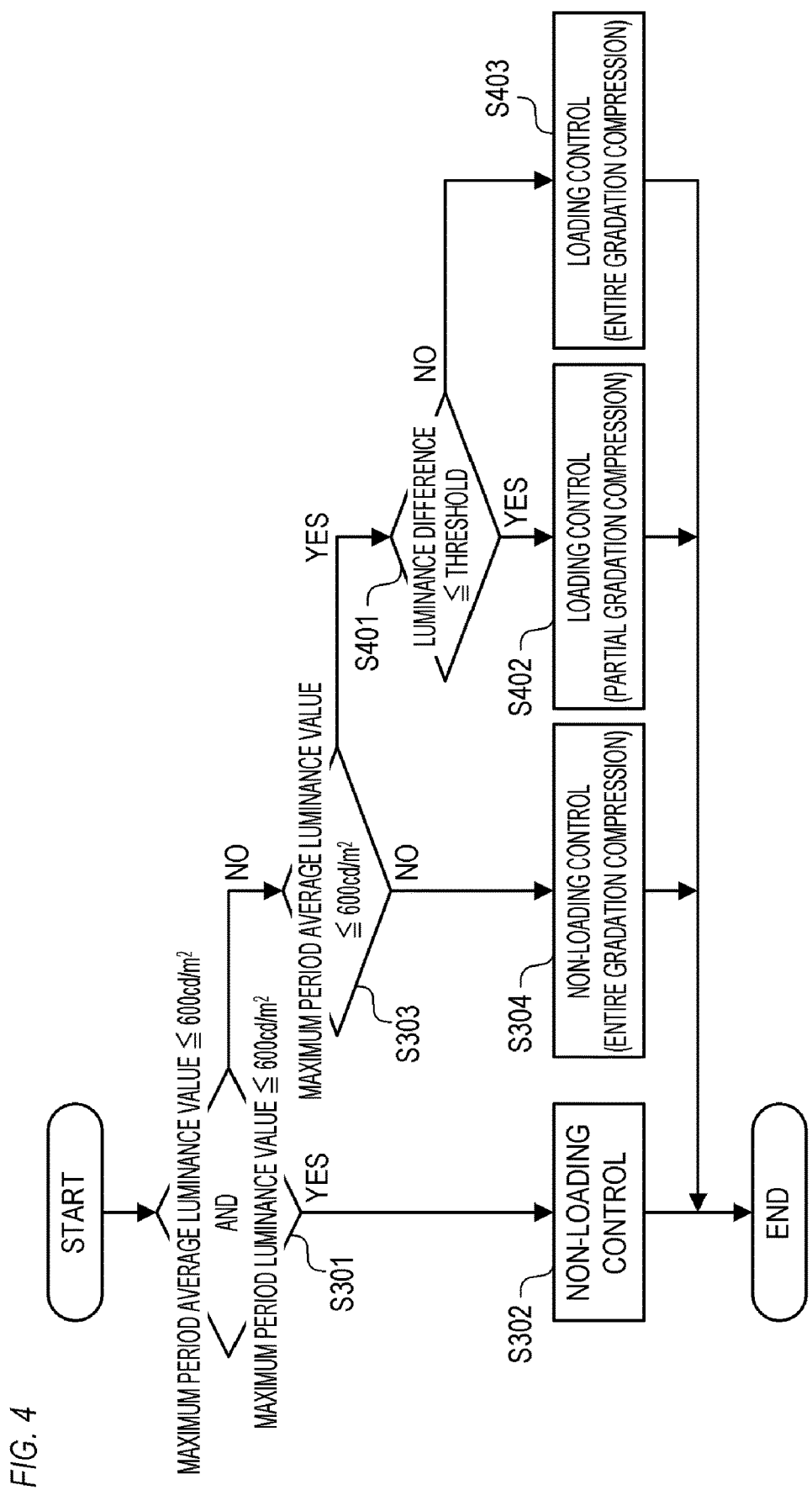
FIG. 4 is a flowchart for illustrating an exemplary processing flow according to a modification of the first embodiment.

In step S305 in FIG. 3, the display control unit 105 may select one of the plurality of kinds of gradation control processing and control the processing by the image processing unit 102 so that the selected gradation compression processing is carried out. The plurality of kinds of gradation compression processing may include the partial gradation compression processing for compressing a part of the dynamic range of target image data and the entire gradation compression processing for compressing the entire dynamic range of target image data. For example, the display control unit 105 may select the partial gradation compression processing or the entire gradation compression processing on the basis of the difference between the maximum period luminance value in a video content and 1000 cd/m² which is the upper limit display luminance value in the loading control. More specifically, the processing flow in FIG. 4 may be carried out in place of the processing flow in FIG. 3. In the processing flow in FIG. 4, the processing steps identical to those in FIG. 3 are designated by the same reference characters in FIG. 3. In the processing flow in FIG. 4, when the maximum period average luminance value is 600 cd/m² or less, the processing proceeds from step S303 to step S401.

In step S401, the display control unit 105 determines whether the difference between the maximum period luminance value in the video content and 1000 cd/m² which is the upper limit display luminance value is not more than the threshold value. The threshold value in step S401 for example accounts for 20% of 1000 cd/m² (200 cd/m²) which is the upper limit display luminance value in the loading control. If the difference is not more than the threshold value, the processing proceeds from step S401 to step S402, and if the difference is greater than the threshold value, the processing proceeds from step S401 to step S403.

If the difference between the maximum period luminance value and 1000 cd/m² which is the upper limit display luminance value in the loading control is not more than the threshold value, the partial gradation conversion processing with a relatively small reduction in the gradation of a compressed section can be carried out. Therefore, in step S402, the display control unit 105 controls processing by the image processing unit 102 so that the partial gradation conversion processing is carried out. The display control unit 105 sets the control mode for the loading control (carrying out the power limiting processing).

If the difference between the maximum period luminance value and 1000 cd/m² which is the upper limit display luminance value is greater than the threshold value, the partial gradation compression processing with a relatively small reduction in the gradation of a compressed section cannot be carried out. Therefore, in step S403, the display control unit 105 controls processing by the image processing unit 102 so that the entire gradation conversion processing is carried out. The display control unit 105 also sets the control mode for the loading control (carrying out the power limiting processing). Note that in step S304, the display control unit 105 sets the control mode for the non-loading control and controls the processing by the image processing unit 102 so that the entire gradation conversion processing is carried out.

Figure 5A:
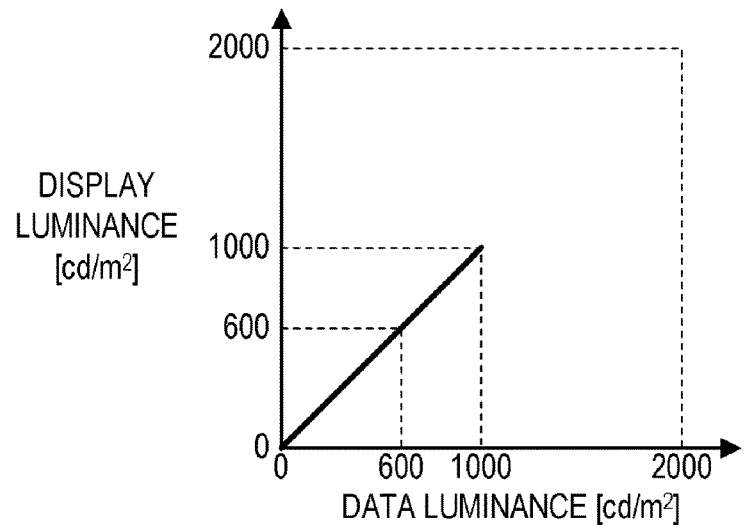
FIGS. 5A to 5C are graphs representing an exemplary corresponding relation between data luminance and display luminance according to the modification of the first embodiment.
Figure 5B:
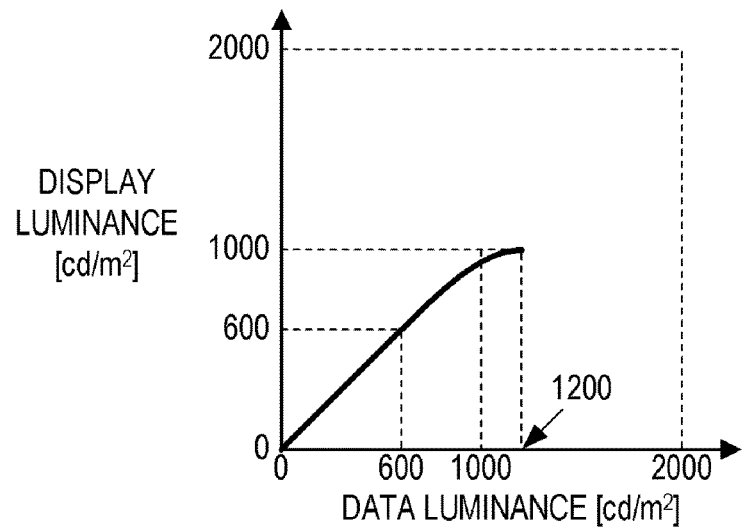
Figure 5C:
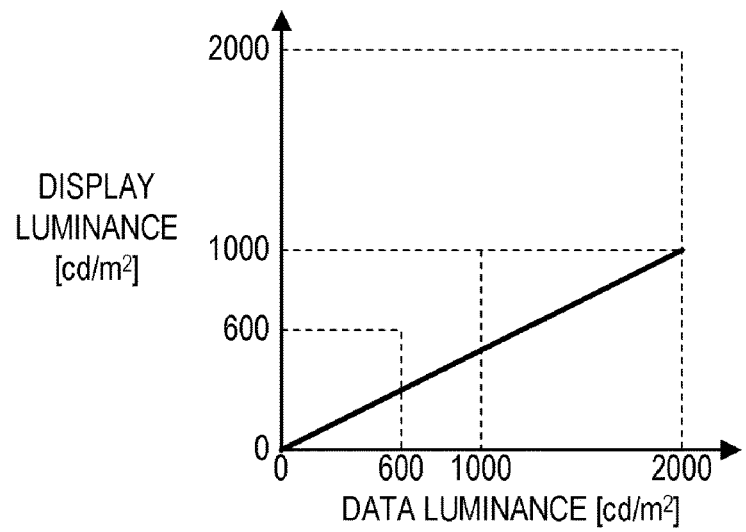

FIGS. 5A to 5C illustrate an exemplary corresponding relation between the luminance (data luminance) of target image data and display luminance. Note that the data luminance may be translated into relative luminance (%). A relative luminance of 100% corresponds to an absolute luminance value of 100 cd/m².

FIG. 5A illustrates an exemplary case in which the maximum data luminance value is 1000 cd/m². In this case, a drop in the dynamic range is not caused by the gradation compression processing. In FIG. 5A, the display luminance value linearly increases (a linear characteristic) from 0 cd/m² to 1000 cd/m² in response to increase in the data luminance value from 0 cd/m² to 1000 cd/m².

FIG. 5B illustrates an exemplary case in which the maximum data luminance value is 1200 cd/m² and the case corresponds to step S402 (where the difference between the maximum period luminance value and 1000 cd/m² which is the upper limit display luminance value is not more than 200 cd/m² which is equal to the threshold value). In FIG. 5B, the data luminance range above 600 cd/m² is compressed so that the data luminance range not more than 1200 cd/m² is mapped to the display luminance range not more than 1000 cd/m² (the partial gradation compression processing). In this way, there is a drop in the display luminance in the data luminance range higher than 600 cd/m², while display luminance equal to data luminance can be provided for the data luminance range not more than 600 cd/m². The entire data luminance range can be displayed with a sufficiently high gradation level.

More specifically, in FIG. 5B, a data luminance range higher than 600 cd/m² is compressed so that the display luminance continuously changes in response to continuous change in the data luminance for the entire data luminance range. The partial gradation compression processing is called "knee processing." Note that the partial gradation compression processing is not limited to the knee processing. For example, in FIG. 5B, as for the data luminance range higher than 600 cd/m², the display luminance non-linearly increases in response to increase in the data luminance, while the display luminance may linearly increase in response to increase in the data luminance. When the display luminance discontinuously changes in response to continuous change in the data luminance between the compressed part and the non-compressed part, picture quality degradation (steps in the display luminance within the display screen) may be caused. Therefore, the knee processing is preferably carried out as the partial gradation compression processing.

FIG. 5C illustrates an exemplary case in which the maximum data luminance value is 2000 cd/m², which corresponds to step S403 (where the difference between the maximum period luminance value and 1000 cd/m² which is the upper limit display luminance value in the loading control is greater than 200 cd/m² which is equal to the threshold value). In FIG. 5C, the entire data luminance range is compressed (the entire gradation compression processing) so that the data luminance range not more than 2000 cd/m² is mapped to the display luminance range not more than 1000 cd/m². In FIG. 5C, the display luminance value linearly increases from 0 cd/m² to 1000 cd/m² in response to increase in data luminance from 0 cd/m² to 2000 cd/m² (a linear characteristic). In this way, the linear characteristic is maintained while the entire gradation characteristic of the entire data luminance range can be checked.

Second Embodiment

Now, a second embodiment of the present invention will be described. In the following description of the embodiment, luminance faithful to target image data can be provided. Note that in the following, features (processing steps) different from the first embodiment will be described in detail while the features identical to those of the first embodiment will be not be described.

FIG. 6 illustrates exemplary control modes according to the embodiment. As shown in FIG. 6, the display apparatus 100 has a control mode for loading control, a control mode for first non-loading control, and a control mode for second non-loading control.

In FIG. 6, the threshold value for the power limiting processing is 500 cd/m². In the loading control, when the average frame luminance value is not more than 500 cd/m², the upper limit display luminance value is set to 1200 cd/m². Note however that the user may manually set an upper limit display luminance value of 1200 cd/m² or less. In the first non-loading control, the upper limit display luminance value is set to 1000 cd/m². In the second non-loading control, the upper limit luminance value is set to 600 cd/m². In the loading control, the black display luminance value is 0.005 cd/m². The upper limit display luminance value of 1000 cd/m² in the first non-loading control is higher than the upper limit display luminance value of 600 cd/m² in the second non-loading control. However, 0.010 cd/m² as the black display luminance value in the first non-loading control is higher than the black display luminance of 0.005 cd/m² in in the second non-loading control. In the loading control mode, the maximum value for the displayable average frame luminance (the upper limit average display luminance value) is 500 cd/m². In the first non-loading control mode for the first non-loading control, the maximum value for the displayable average frame luminance (the upper limit average display luminance) is 1000 cd/m². In the second non-loading control mode for the second non-loading control, the maximum value for the displayable average frame luminance (the upper limit average display luminance) is 600 cd/m².

Figure 7:
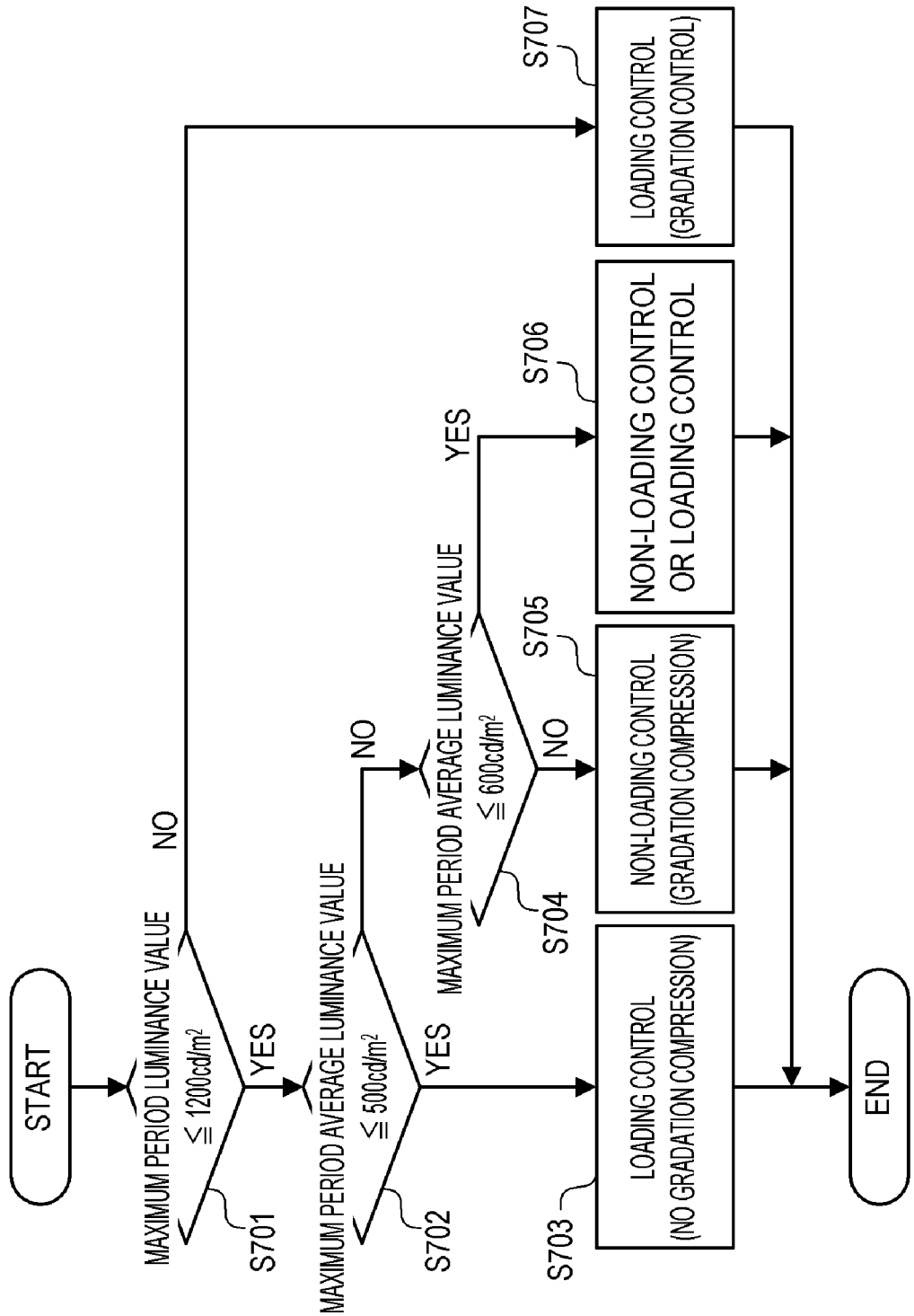
FIG. 7 is a flowchart for illustrating an exemplary processing flow according to the second embodiment.

FIG. 7 is a flowchart for illustrating an exemplary processing flow by the display apparatus 100 according to the embodiment. The processing flow in FIG. 7 starts for example when target image data is obtained and luminance information (at least one of the average luminance information and the maximum luminance information) changes. Here, it is assumed that the display apparatus 100 has the control modes shown in FIG. 6.

In step S701, the display control unit 105 determines whether the maximum period luminance value in a video content is not more than 1200 cd/m² which is the upper limit display luminance value in the loading control. If the maximum period luminance value is not more than 1200 cd/m², the processing proceeds from step S701 to step S702. If the maximum period luminance value is higher than 1200 cd/m², the processing proceeds from step S701 to step S707.

In none of the loading control, the first non-loading control, and the second non-loading control, a display luminance value higher than 1200 cd/m² can be provided. Therefore, when the maximum period luminance value is higher than 1200 cd/m², gradation compression control is necessary. The upper limit display luminance value of 1200 cd/m² in the loading control is higher than the upper limit display luminance value (1000 cd/m² and 600 cd/m²) in the non-loading control. Therefore, when the maximum period luminance value is higher than 1200 cd/m², a luminance drop caused by the gradation compression processing when the loading control is carried out is smaller than a luminance drop caused by the gradation compression processing when the non-loading control is carried out. More specifically, display luminance more faithful to target image data can be provided in the loading control than in the non-loading control. Therefore, the display control unit 105 sets the control mode for the loading control in step S707 (carrying out the power limiting processing). The display control unit 105 controls the processing by the image processing unit 102 so that the gradation compression control is carried out.

In step S702, the display control unit 105 determines whether the maximum period average luminance value in the video content is not more than 500 cd/m² (equal to or lower than the upper limit average display luminance value in the loading control) which is the threshold value in the power limiting processing. If the maximum period average luminance value is not more than 500 cd/m², the processing proceeds from step S702 to step S703. If the maximum period average luminance value is higher than 500 cd/m², the processing proceeds from step S702 to step S704.

In the loading control, a display luminance of 1200 cd/m² or less can be provided. If the maximum period average luminance value is not more than 500 cd/m² which is the threshold value in the power limiting processing, power limiting associated with the loading control is not applied, so that a drop in the display luminance attributable to the power limiting processing is not caused. Therefore, in step S703, the display control unit 105 sets the control mode for the loading control (carrying out the power limiting processing). The display control unit 105 controls the processing by the image processing unit 102 so that the gradation compression processing is not carried out.

In step S704, the display control unit 105 determines whether the maximum period average luminance value in the video content is not more than 600 cd/m² which is the upper limit display luminance value (the upper limit average display luminance value) in the second non-loading control. If the maximum period average luminance value in the video content is higher than 600 cd/m², the processing proceeds from step S704 to step S705. If the maximum period average luminance value is not more than 500 cd/m², the processing proceeds from step S704 to step S706.

If the maximum period average luminance value is higher than 600 cd/m², it is considered that a majority of frames has an average frame luminance value higher than 500 cd/m² which is the threshold value in the power limiting processing. It is also considered that as a drop in the display luminance caused by the power limiting processing is large, fluctuations are more likely to be caused in the display luminance between frames with an average frame luminance value higher than 500 cd/m² which is the threshold value in the power limiting processing and the rest of the frames. In S705, the display control unit 105 sets the control mode for non-loading control (the first non-loading control or the second non-loading control). In step S705, the maximum period average luminance value is higher than 600 cd/m², and therefore the maximum period luminance value is naturally higher than 600 cd/m². In the second non-loading control mode, as the upper limit display luminance value is 600 cd/m², for example the gradation compression processing is carried out so that the value of the maximum luminance for target image data in the entire period of the video content (the maximum entire content luminance value) is reduced to 600 cd/m². In this case, the degree of how much the display luminance is reduced is fixed in the entire period of the video content, and therefore fluctuations in the display luminance can be reduced.

In step S706, the display control unit 105 determines whether the maximum period luminance value in the video content is not more than 600 cd/m² which is the upper limit display luminance value in the non-loading control. If the maximum period luminance value is not more than 600 cd/m², the second non-loading control is carried out, and if the maximum period luminance value is higher than 600 cd/m², the loading control is carried out. For example, in step S701, the maximum entire content luminance value is used, and in step S706, the maximum scene luminance value is used. In the period of a scene with a maximum scene luminance value of 600 cd/m² or less, the non-loading control is carried out, and in the period of a scene with a maximum scene luminance value higher than 600 cd/m², the loading control is carried out. Note that the maximum period luminance value used in steps S701 and S706 is not particularly limited. For example, the maximum scene luminance value may be used in both of steps S701 and step S706, or the maximum entire content luminance value may be used in both of steps S701 and S706. The maximum scene luminance value may be used in step S701, and the maximum entire content luminance value may be used in step S706.

When the "local dimming control" is carried out in the liquid crystal apparatus, halo is more likely to be caused as the upper limit emission luminance of the light source is higher as described above. More specifically, in the loading control mode in which the upper limit display luminance value is 1000 cd/m², halo is more likely to be caused than in the non-loading control mode in which the upper limit display luminance value is 600 cd/m². Therefore, halo may be reduced by carrying out the non-loading control in the period of a scene with a maximum scene luminance value of 600 cd/m² or less. Note however that if the effect of halo may be disregarded, the loading control may always be carried out in step S706. In a self-emitting type display apparatus such as an organic EL display apparatus, halo is less likely to be caused, and the loading control mode may always be carried out in step S706.

If the result of determination is YES in step S704 and the processing proceeds to step S706, the maximum period average luminance value is higher than 500 cd/m² and not more than 600 cd/m². In this case, it is considered that the drop in the display luminance caused by the power limiting processing is small, and a disadvantage associated with the loading control is small. In the non-loading control, a display luminance value higher than 600 cd/m² cannot be provided. When the maximum period luminance value is higher than 600 cd/m², display luminance faithful to the target image data cannot be provided. Meanwhile, in the loading control, a display luminance value higher than 600 cd/m² may be provided in some cases. In addition, display luminance faithful to the target image data may be provided in some cases even when the maximum period luminance value is higher than 600 cd/m² (for example when a local small-sized area with high luminance is present in the target image data). Therefore, in the period of a scene with a maximum scene luminance value higher than 600 cd/m², the loading control is carried out. In the loading control, the upper limit display luminance value is set to 1000 cd/m² or less. Therefore, the gradation compression processing for compressing the dynamic range of the target image data to 1000 cd/m² or less is carried out.

As described above, according to the embodiment, the control (control mode) in the period corresponding to the maximum period average luminance value and the maximum period luminance value is determined on the basis of the maximum period average luminance value and the period luminance value in the video content. In this way, each frame of the target image data can be displayed with suitable display luminance. For example, the kind of control is determined on the basis of the difference between the maximum period average luminance value and each of the upper limit display luminance values, so that display luminance more faithful to the target image data than the first embodiment can be provided.

Modification of Second Embodiment

Figure 8:
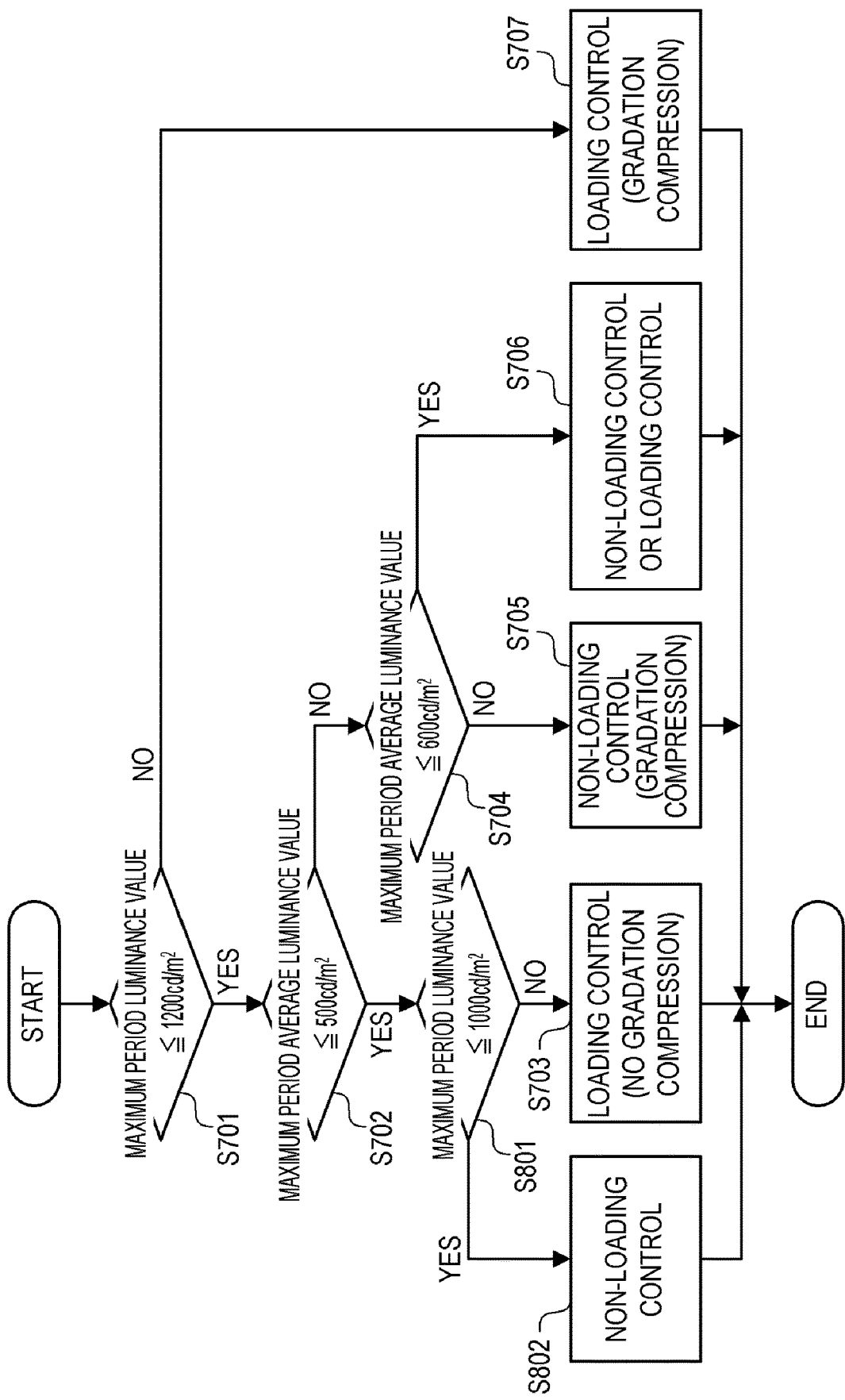
FIG. 8 is a flowchart for illustrating an exemplary processing flow according to a modification of the second embodiment.

The processing flow in FIG. 8 may be carried out instead of the processing flow in FIG. 7. In FIG. 8, the processing steps identical to those in FIG. 7 are designated by the same reference characters in FIG. 7. In the processing flow in FIG. 8, display luminance more faithful to target image data than in the processing flow in FIG. 7 can be provided. In the processing flow in FIG. 8, when the maximum period average luminance value is not more than 500 cd/m², the processing proceeds from step S702 to step S801. In step S801, the display control unit 105 determines whether the maximum period luminance value is not more than 1000 cd/m² which is the upper limit display luminance value in the first non-loading control. If the maximum period luminance value is higher than 1000 cd/m², the processing proceeds from step S801 to step S703. If the maximum period luminance value is 1000 cd/m² or less, the processing proceeds from step S801 to step S802.

If the maximum period luminance value is higher than 1000 cd/m² and the non-loading control (the first non-loading control and the second non-loading control) is carried out, a luminance drop may be caused by the gradation compression processing. Therefore, in the loading control, display luminance more faithful to the target image data can be provided than in the non-loading control. Therefore, if the maximum period luminance value is higher than 1000 cd/m², the processing proceeds from step S801 to step S703 and the control mode for the loading control is set.

If the maximum period luminance value is 1000 cd/m² or less, the first non-loading control is carried out, so that display luminance faithful to the target image data can be provided without carrying out the gradation compression processing. Therefore, in step S802, the display control unit 105 sets the control mode for the first non-loading control (without carrying out the power limiting processing). Note that if the maximum period luminance value is not more than 600 cd/m², the second non-loading control allows display luminance faithful to the target image data to be provided while the gradation compression processing is not carried out. Therefore, the control mode for carrying out the second non-loading control may be set. The second non-loading control can reduce the black display luminance and suppress black floating or halo.

The functional units according to the first and second embodiments may be either discrete hardware or not. The functions of at least two functional units may be implemented by common hardware. Multiple functions of one functional unit may each be implemented by discrete hardware. At least two functions of one functional unit may be implemented by common hardware. The functional units may each by implemented by hardware or not. For example, an apparatus may have a processor and a memory which stores programs. The function of at least one functional unit of the apparatus may be implemented as the processor reads out a control program from the memory and executes the program.

The first and second embodiments have been described simply by way of illustration, and features and configurations provided by modifying or changing the features and configurations of the first and second embodiments without departing from the gist of the invention fall within the scope of the invention. The present invention also includes features and configurations obtained by combining the first and second embodiments as appropriate.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-054294, filed on Mar. 22, 2018, which is hereby incorporated by reference herein in its entirety.

What is claimed is:

1. A display control apparatus comprising an input terminal configured to obtain a target image data; and
  at least one processor that operates as:
    an obtaining unit configured to obtain, from metadata of the target image data, a luminance information representing a maximum average luminance of the target image data in a first period including a plurality of frames, wherein the maximum average luminance is a maximum value of average luminances, and each of average luminances is an average luminance of the target image data in each of the plurality of frames; and
    a setting unit configured to set one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein
  the setting unit sets the second control mode in a case where the maximum average luminance is higher than a first threshold value on the basis of the luminance information.

2. The display control apparatus according to claim 1, wherein the setting unit sets the first control mode in a case where the maximum average luminance is equal to or less than the first threshold value on the basis of the luminance information.

3. The display control apparatus according to claim 1, wherein in the power limiting processing, the display luminance is reduced in a case where average frame luminance which is average luminance in a frame is higher than a second threshold value,
  upper limit display luminance in the second control mode is second upper limit display luminance which is lower than first upper limit display luminance and higher than the second threshold value, the first upper limit display luminance being upper limit display luminance in the first control mode in a case where the average frame luminance is equal to or less than the second threshold, and
  the first threshold value is the second upper limit display luminance.

4. The display control apparatus according to claim 3, wherein the obtaining unit further obtains maximum luminance information in target image data in a second period including the plurality of frames, representing maximum period luminance,
  the setting unit sets the first control mode, regardless of whether the maximum average luminance is equal to or less than the first threshold value, in a case where the maximum period luminance is equal to or less than the first upper limit display luminance and the maximum average luminance is equal to or less than the second threshold value.

5. The display control apparatus according to claim 4, wherein
  the first period is a period including a plurality of scenes, and
  the second period is a period of one scene.

6. The display control apparatus according to claim 3, wherein the obtaining unit further obtains maximum luminance information in target image data in a second period including the plurality of frames, representing maximum period luminance,
  in a case where the maximum average luminance is equal to or less than the second threshold value,
    the setting unit sets the first control mode, regardless of whether the maximum average luminance is equal to or less than the first threshold value, if the maximum period luminance is higher than the first threshold value and equal to or less than the first upper limit display luminance, and
    the setting unit sets the second control mode, regardless of whether the maximum average luminance is equal to or less than the first threshold value, if the maximum period luminance is equal to or less than the first threshold value.

7. The display control apparatus according to claim 3, wherein the obtaining unit further obtains maximum luminance information in target image data in a second period including the plurality of frames, representing maximum period luminance, and
in a case where the maximum period luminance is higher than the first upper limit display luminance, the setting unit sets the first control mode regardless of whether the maximum average luminance is higher than the first threshold value.

8. The display control apparatus according to claim 7, wherein in the first control mode in a case where the maximum period luminance is higher than the first upper limit display luminance, the image is displayed at the display unit with carrying out gradation conversion processing for compressing a luminance range of the target image data to a predetermined luminance range and the power limiting processing, and
in the first control mode in a case where the maximum period luminance is equal to or less than the first upper limit display luminance, the image is displayed at the display unit with carrying out the power limiting processing and without carrying out the gradation conversion processing.

9. The display control apparatus according to claim 8, wherein in the first control mode, processing for compressing a part of a luminance range of the target image data or processing for compressing entire of the luminance range of the target image data is carried out as the gradation conversion processing on the basis of a difference between the maximum period luminance and the first upper limit display luminance.

10. The display control apparatus according to claim 1, wherein the obtaining unit further obtains maximum luminance information in target image data in a second period including the plurality of frames, representing maximum period luminance which is maximum luminance in target image data in a second period including the plurality of frames,
the setting unit sets the first control mode in a case where the maximum average luminance is equal to or less than the first threshold value and the maximum period luminance is higher than the first threshold value, and
the setting unit sets the second control mode in a case where the maximum average luminance is equal to or less than the first threshold value and the maximum period luminance is equal to or less than the first threshold value.

11. The display control apparatus according to claim 3, wherein the obtaining unit further obtains maximum luminance information in target image data in a second period including the plurality of frames, representing maximum period luminance,
the setting unit sets the first control mode in a case where the maximum average luminance is equal to or less than the first threshold value and the maximum period luminance is higher than the first threshold value, and
the setting unit sets the second control mode in a case where the maximum average luminance is higher than the first threshold value and the maximum period luminance is equal to or less than the first threshold value and a case where the maximum average luminance and the maximum period luminance are equal to or less than the first threshold value.

12. The display control apparatus according to claim 11, wherein in the first control mode, the image is displayed at the display unit with carrying out gradation conversion processing for compressing a luminance range of the target image data to a predetermined luminance range and the power limiting processing are carried out.

13. A display control apparatus comprising
an input terminal configured to obtain a target image data; and
at least one processor that operates as:
an obtaining unit configured to obtain, from metadata of the target image data, a luminance information representing a maximum average luminance of the target image data in a first period including a plurality of frames and a first maximum luminance information representing first maximum period luminance which is maximum luminance in target image data in the first period, wherein the maximum average luminance is a maximum value of average luminances, and each of average luminances is an average luminance of the target image data in each of the plurality of frames; and
a setting unit configured to set one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein
the setting unit sets the first control mode in a case where the first maximum period luminance is equal to or less than predetermined upper limit display luminance and the maximum average luminance is equal to or less than first upper limit average display luminance.

14. The display control apparatus according to claim 13, wherein the setting unit sets the first control mode in a case where the first maximum period luminance is higher than the predetermined upper limit display luminance.

15. The display control apparatus according to claim 13, wherein the setting unit sets the second control mode in a case where the first maximum period luminance is equal to or less than the predetermined upper limit display luminance and the maximum average luminance is higher than second upper limit average display luminance which is higher than the first upper limit average display luminance.

16. The display control apparatus according to claim 13, wherein the obtaining unit further obtains second maximum luminance information representing second maximum period luminance which is maximum luminance in target image data in a second period which is shorter than the first period, and
the setting unit sets one of the first control mode and the second control mode on the basis of the second maximum luminance information in a case where the first maximum period luminance is equal to or less than the predetermined upper limit display luminance and the maximum average luminance is higher than the first upper limit average display luminance and equal to or less than a second upper limit average display luminance.

17. A display control method comprising:
an input step of obtaining a target image data;
an obtaining step of obtaining, from metadata of the target image data, a luminance information representing a maximum average luminance of the target image data in a first period including a plurality of frames, wherein the maximum average luminance is maximum average luminances, and each of average luminances is an average luminance of the target image data in each of the plurality of frames; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the second control mode is set in a case where the maximum average luminance is higher than a first threshold value on the basis of the luminance information.

18. A display control method comprising:

an input step of obtaining a target image data;

an obtaining step of obtaining, from metadata of the target image data, a luminance information representing a maximum average luminance of the target image data in a first period including a plurality of frames and first maximum luminance information representing first maximum period luminance which is maximum luminance in the target image data in the first period, wherein the maximum average luminance is a maximum value of average luminances, and each of the average luminances is an average luminance of the target image data in each of the plurality of frames; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the first control mode is set in a case where the first maximum luminance is equal to or less than predetermined upper limit display luminance and the maximum average luminance is equal to or less than first upper limit display luminance.

19. A non-transitory computer readable medium that stores a program, wherein the program causes a computer to execute:

an input step of obtaining a target image data;

an obtaining step of obtaining, from metadata of the target image data, a luminance information representing a maximum average luminance of the target image data in a first period including a plurality of frames, wherein the maximum average luminance is a maximum value of average luminances, and each of average luminances is an average luminance of the target image data in each of the plurality of frames; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the second control mode is set in a case where the maximum average luminance is higher than a first threshold value on the basis of the luminance information.

20. A non-transitory computer readable medium that stores a program, wherein the program causes a computer to execute:

an input step of obtaining a target image data;

an obtaining step of obtaining, from metadata of the target image data, a luminance information representing a maximum average luminance of the target image data in a first period including a plurality of frames and first maximum luminance information representing first maximum period luminance which is maximum luminance in the target image data in the first period, wherein the maximum average luminance is a maximum value of average luminances, and each of average luminances is an average luminance of the target image data in each of the plurality frames; and a setting step of setting one of a first control mode for displaying an image based on the target image data at a display unit with carrying out power limiting processing for reducing display luminance of each frame so that power consumption by the display unit is equal to or less than a predetermined power threshold value and a second control mode for displaying the image at the display unit without carrying out the power limiting processing, wherein in the setting step, the first control mode is set in a case where the first maximum luminance is equal to or less than predetermined upper limit display luminance and the maximum average luminance is equal to or less than first upper limit average display luminance.

* * * * *